(12) United States Patent
Clark

(10) Patent No.: US 8,859,987 B2
(45) Date of Patent: Oct. 14, 2014

(54) SENSOR HOUSING

(75) Inventor: Nigel Clark, Berkshire (GB)

(73) Assignee: Hanovia Limited (GB)

( * ) Notice: Subject to any disclaimer, the term of this patent is extended or adjusted under 35 U.S.C. 154(b) by 4 days.

(21) Appl. No.: 13/578,988

(22) PCT Filed: Feb. 16, 2011

(86) PCT No.: PCT/GB2011/000219
§ 371 (c)(1),
(2), (4) Date: Nov. 5, 2012

(87) PCT Pub. No.: WO2011/101633
PCT Pub. Date: Aug. 25, 2011

(65) Prior Publication Data
US 2013/0048879 A1    Feb. 28, 2013

(30) Foreign Application Priority Data

Feb. 19, 2010  (GB) .................................. 1002897.5

(51) Int. Cl.
*G01D 11/24* (2006.01)
(52) U.S. Cl.
CPC .................................... *G01D 11/245* (2013.01)
USPC ................ 250/432 R; 250/455.11; 250/505.1
(58) Field of Classification Search
USPC ........ 250/455.11, 496.1–498.1, 506.1–507.1, 250/428, 432 R–438
See application file for complete search history.

(56) References Cited

U.S. PATENT DOCUMENTS

| | | | |
|---|---|---|---|
| 6,370,339 B1 * | 4/2002 | Stern et al. | 396/429 |
| 2003/0218128 A1 * | 11/2003 | Schulz | 250/252.1 |
| 2005/0104011 A1 * | 5/2005 | Schindlbeck et al. | 250/485.1 |
| 2005/0155886 A1 * | 7/2005 | Nakajo | 206/455 |
| 2006/0163168 A1 | 7/2006 | Moody et al. | |
| 2010/0084187 A1 * | 4/2010 | Pearson | 174/565 |
| 2010/0127018 A1 * | 5/2010 | Laidler et al. | 222/207 |
| 2012/0273679 A1 * | 11/2012 | Bewick et al. | 250/310 |

FOREIGN PATENT DOCUMENTS

| | | |
|---|---|---|
| DE | 102008050902 | 3/2010 |
| GB | 2174197 | 10/1986 |
| GB | 2174197 A * | 10/1986 |
| GB | 2389848 | 12/2003 |
| WO | WO-9910717 | 3/1999 |
| WO | WO-2011/101633 A2 | 8/2011 |

OTHER PUBLICATIONS

"Great Britain Application Serial No. GB1002897.5, Search Report dated Mar. 29, 2010", 1 pg.
"International Application Serial No. PCT/GB2011/000219, International Search Report mailed Aug. 30, 2011", 3 pgs.

(Continued)

*Primary Examiner* — Nicole Ippolito
*Assistant Examiner* — David E Smith
(74) *Attorney, Agent, or Firm* — Schwegman Lundberg & Woessner, P.A.

(57) ABSTRACT

A sensor housing (10) in which a radiation sensor can be inserted through a sensor aperture (28) has blocking means (30, 32) that can move between an open position and a closed position. When the blocking means (30, 32) are in the closed position they prevent radiation from passing out of the sensor aperture (28). The blocking means may take the form of shutters that that close when the radiation sensor is removed, thus stopping radiation from passing through the housing (10).

14 Claims, 12 Drawing Sheets

(56) References Cited

OTHER PUBLICATIONS

"International Application Serial No. PCT/GB2011/000219, Written Opinion mailed Aug. 30, 2011", 6 pgs.

"Great Britain Application Serial No. GB1002897.5, Examination Report mailed Mar. 6, 2014", 3 pgs.

"International Application Serial No. PCT/GB2011/000219, International Preliminary Report on Patentability Aug. 21, 2012", 7 pgs.

* cited by examiner

SENSOR HOUSING

RELATED APPLICATIONS

This application is a nationalization under 35 U.S.C. §371 from International Application Ser. No. PCT/GB2011/000219, filed Feb. 16, 2011 and published as WO 2011/101633 A2 on Aug. 25, 2011, which claims benefit of priority to United Kingdom Application No.1002897.5, filed Feb. 19, 2010; which applications and publication are incorporated herein by reference in their entirety.

The present application relates to a housing for a sensor. More particularly, the invention relates to a sensor housing for a system that uses Ultraviolet (UV) radiation.

UV radiation is often used to treat fluids, for example to kill undesirable organisms that are present within the fluid. A common example of this is the treatment of drinking water. When treating drinking water, it is necessary that a sufficient dose of UV radiation has been supplied to the fluid to ensure that the treatment will be successful.

When treating fluids in this manner, the fluid is normally passed through a chamber which has one or more lamps that emit UV radiation into the chamber. To avoid exposure of those working around the chamber, the chamber is generally configured so as to prevent UV radiation from exiting. For example, chambers are often formed from stainless steel, which will block UV radiation.

To ensure that the correct dose of UV radiation has been applied to the fluid within the chamber, sensors are often used to monitor the intensity of radiation. The sensors may be permanently installed in the chamber, or may be inserted temporarily by an operator when a measurement is desired. An advantage of a permanently installed sensor is that a constant measurement of the intensity of UV can be made. However, the sensitivity of the UV sensors may change over time, and thereby affect the accuracy of the measurement obtained. Therefore, it is advantageous to have a removable sensor so that a sensor with a known calibration can be inserted in the system. By using such a removable sensor, its calibration can be checked using an external apparatus.

Since the sensor must sample a portion of the UV radiation that is emitted by the treatment system, when removing a sensor when the treatment system is running some UV radiation will escape. This radiation poses a hazard for the operator who is removing or inserting a sensor and other personal in line of sight of the exposed UV lamp. Typically, this hazard will be avoided by ensuring that the UV radiation source is turned off during the period when the sensor is being removed or replaced, or by the operator wearing suitable protective apparel. However, turning off the UV radiation for a period will cause an interruption to the function of the treatment system.

Accordingly, there is a need for a sensor housing that enables removal or insertion of a sensor without subjection an operator or others to irradiation from the open sensor port.

In a first aspect, the present invention provides a sensor housing. A radiation sensor can be inserted and removed from the housing through a sensor aperture and positioned in a sensor space within the housing. The sensor housing has a radiation aperture through which radiation can reach the sensor when it is located in the sensor space. The housing has blocking means arranged to be movable between an open position and a closed position in which radiation is blocked from passing through the sensor aperture.

The blocking means may take the form of shutters that can close and block the radiation aperture.

The radiation sensor housing can be mounted on a chamber inside which a fluid is treated with radiation. Since blocking means prevents the radiation from escaping through the radiation aperture when in the closed position, radiation from a radiation source within the chamber is prevented from escaping. Thus, the sensor can be removed without the need to turn off the radiation source within the chamber.

According to an embodiment of the present invention, the blocking means is arranged to move towards the open position in dependence upon movement of the sensor into the sensor space.

Because the blocking means moves towards the open position in dependence upon the movement of the sensor, separate controls for opening the blocking means are not required.

According to an embodiment of the present invention, the blocking means is operable to move towards the closed position in dependence upon movement of the sensor out of the sensor space.

Similarly, separate controls for closing the blocking means are not required as the blocking means close in dependence upon the movement of the sensor.

According to an embodiment of the present invention, the sensor housing is arranged to cooperate with the sensor such that when the blocking means is between the open position and the closed position radiation from the radiation aperture is blocked from passing out of the sensor space through the sensor aperture by the sensor and the blocking means together.

Radiation is blocked from passing out of the sensor space when the sensor is in place either by the blocking means and the sensor or by the sensor on its own. This protects an operator from the radiation when inserting and removing the sensor. This further ensures that radiation is blocked from passing out of the chamber at all times.

According to an embodiment of the present invention, the radiation sensor housing further comprises biasing means for biasing the blocking means towards the closed position.

The biasing means urges the blocking means to revert to the closed position in which radiation is blocked from passing out of the sensor space.

According to an embodiment of the present invention, the blocking means comprises a contact surface and the blocking means is arranged to be responsive through the sensor being forced against the contact surface by moving towards the open position.

Thus, urging the sensor into the radiation sensor housing causes the blocking means to move towards the open position.

According to an embodiment of the present invention, the blocking means comprises at least one shutter. The at least one shutter may be arranged to overlap with the housing when in the closed position. The shutter may overlap with a groove in the body of the housing.

According to an embodiment of the present invention, the blocking means comprises a plurality of shutters.

According to an embodiment of the present invention, when in the closed position, the plurality of shutters are in contact one with another.

According to an embodiment of the present invention, one shutter of the plurality of shutters has a part arranged to overlap with another of the shutters of the plurality of shutters when in the closed position.

This ensures that radiation cannot escape between the shutters when they are in the closed position even if there is small gap between the shutters. The part arranged to overlap with another of the shutters may be a protrusion on one of the shutters.

The shutters may be movable in a direction substantially perpendicular to an axis along which the sensor may be moved in order to move the sensor into or out of the sensor space.

The contact surfaces may be arranged at an acute angle to an axis along which the sensor may be moved in order to move the sensor into the sensor space. Thus, inserting the sensor into the sensor aperture causes the shutters to move into the open position along an axis perpendicular to the direction in which the sensor is inserted into the sensor aperture.

According to an embodiment of the present invention, the radiation sensor housing is for use in a treatment system for the treatment of a fluid. The fluid can take many forms examples include:

The fluid may be water which is treated with UV radiation to neutralise bacteria.

The fluid may be a liquid used in food preparation such as oil or sugar syrup. The fluid may be a fruit juice such as orange juice for human consumption.

The fluid may be air and may be treated to remove smells.

The sensor used in the housing may be used to measure a chemical change of materials in the fluid.

According to an embodiment of the present invention, the radiation sensor housing is a housing for a radiation sensor that senses ultra-violet radiation.

According to an embodiment of the present invention, the blocking means is opaque to ultra-violet radiation.

According to an embodiment of the present invention, the radiation sensor housing is arranged relative to a treatment chamber and a source of electro-magnetic radiation such that in operation, electro-magnetic radiation may pass from the source through the treatment chamber to the radiation aperture of the radiation sensor housing.

According to an embodiment of the present invention, the radiation aperture comprises a window of material translucent or transparent to UV radiation.

The window provides a barrier to the fluid inside the treatment chamber but allows the radiation to pass through.

According to a second aspect of the present invention there is provided an apparatus for treating a fluid with UV radiation. The apparatus comprises a treatment chamber arranged to contain the fluid, a source of UV radiation, and a radiation sensor housing according to a first aspect of the present invention. The source of UV radiation is arranged relative to the treatment chamber so that UV radiation is incident on the fluid within the chamber. The radiation sensor housing is arranged so that UV radiation from the source of UV radiation passes through the radiation aperture of the radiation sensor housing.

In the following, embodiments of the present invention will be described with reference to the drawings in which.

Figure 1:
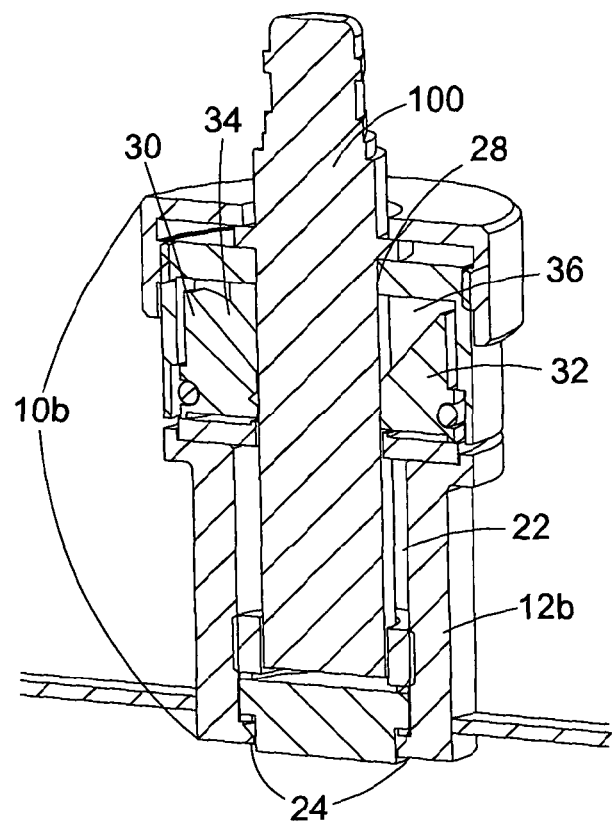
FIG. 1 shows a sensor inserted in a sensor housing mounted on a treatment chamber.

FIG. 1 shows a sensor 100 inserted in a sensor housing 10b mounted on a treatment chamber 200b. A source of UV light is positioned within the treatment chamber 200b. Fluid passing through the treatment chamber 200b is treated with the UV light. The intensity of UV light is measured by the sensor 100. The UV light from the source within the treatment chamber 200b passes through a radiation aperture 24 in the sensor housing 10b and is incident upon the sensor 100 in a sensor space 22 within the sensor housing 10b.

The sensor 100 can be inserted and removed from the sensor space 22 through a sensor aperture 28 in the sensor housing 10b. The sensor housing 10b is arranged in an opening in the treatment chamber 200b and covers the opening. The radiation aperture 24 is on a side of the sensor housing 12b that faces the interior of the treatment chamber 200b. The sensor aperture 28 is on a side of the sensor housing 10b that faces the exterior of the treatment chamber.

To prevent UV light from passing out of the sensor aperture 28 when the sensor 100 is not located in the sensor space 22, blocking means in the form of a pair of shutters 30 and 32 move to a closed position in which the shutters 30 and 32 prevent UV light from passing out of the sensor space 22 through the sensor aperture 28.

The shutters 30 and 32 each have a surface 34 and 36 that is inclined with respect to the axis of movement of the sensor 100 into and out of the sensor space 22. When the sensor 100 is inserted into the sensor space 22 through the sensor aperture 28, the end of the sensor 100 meets the inclined surfaces 34 and 36. As the sensor 100 is pushed against the inclined surfaces 34 and 36 of the shutters 30 and 32, the shutters 30 and 32 are urged apart. Thus movement of the sensor 100 into the sensor space 22 causes the shutters 30 and 32 to move from a closed position to an open position.

When the sensor 100 is moved out of the sensor space 22, springs urge the shutters 30 and 32 together towards the closed position. Thus, as the sensor 100 is moved out of the sensor space 22, the shutters 30 and 32 move from an open position towards a closed position.

Figure 2:
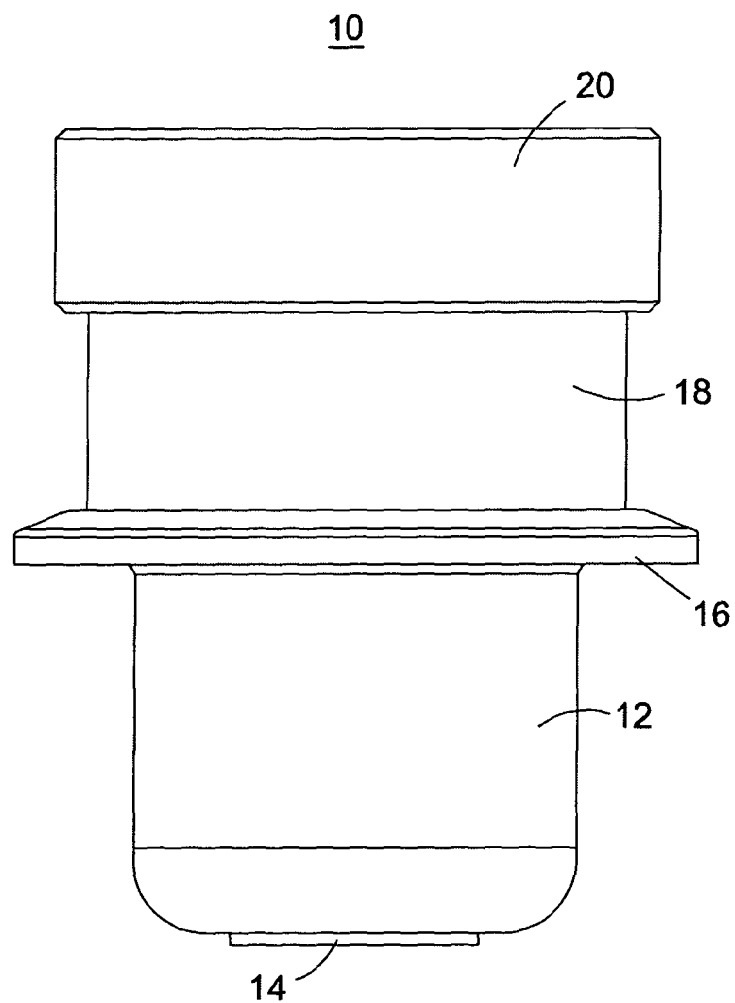
FIG. 2 shows a side view of a sensor housing.

FIG. 2 shows a side view of a sensor housing 10. The sensor housing 10 has a cylindrical body 12. One end of the housing body 12 has rounded corners and a quartz window 14. The housing body 12 extends from the quartz window 14 to an outwardly extending flange 16. Connected to the flanged end of the housing body 12 is a cylindrical housing assembly 18. The housing assembly 18 and the housing body 12 have a common central axis. The housing assembly 18 has a greater diameter than the housing body 12 but a smaller diameter than the outer edge of the flange 16. An annular cap 20 fits over the end of housing assembly 18 opposite to the quartz window 14.

The sensor housing 10 is made from a UV opaque material, example stainless steel. When in use, the sensor housing is positioned in an opening on a chamber used to treat a fluid with UV light. The quartz window 14 is positioned within the chamber and the flange 16 positioned to meet a corresponding flange projecting an appropriate distance from the opening in the chamber.

Alternative shapes for the sensor housing are possible, for example, the corners close to the quartz window may be square or chamfered.

Figure 3:
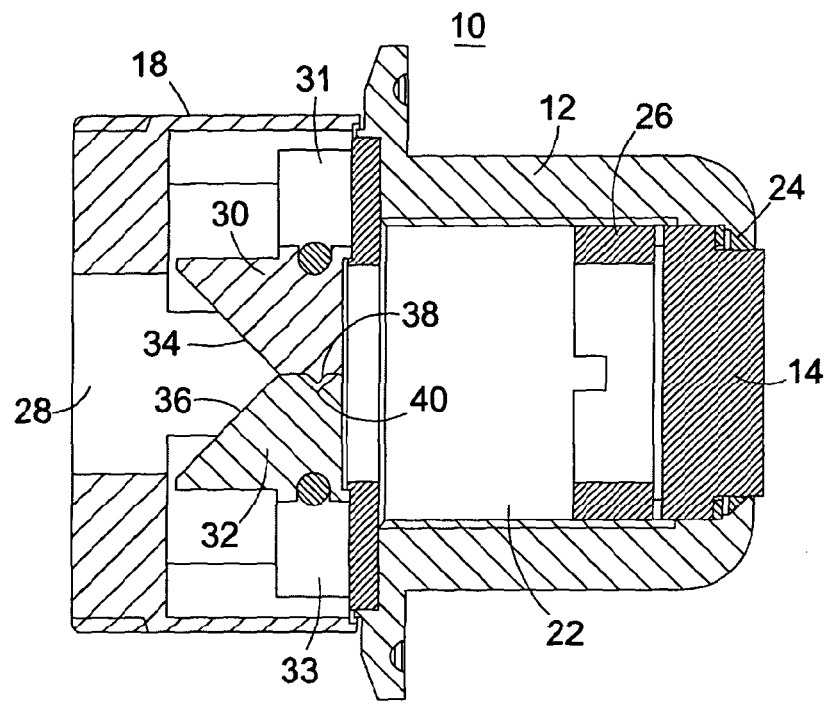
FIG. 3 shows a cross-section of a radiation sensor housing.

FIG. 3 shows a cross-sectional view of the sensor housing 10 with the cap 20 removed. The housing body 12 encloses a cylindrical sensor space 22. At the end of the housing body 12 there is a circular radiation aperture 24. The radiation aperture 24 is covered by a quartz window 14. Within the sensor space 22, adjacent to the quartz window 14, there is an annular spacer 26. The housing assembly 18 has a circular sensor aperture 28 at its end furthest from the housing body 12.

Within the housing assembly 18, there are two shutters 30 and 32. In opposing sides of the inside of the wall of the housing assembly 18, there are two cavities 31 and 33. The shutters 30 and 32 are moveable between an open position in which they are located within the cavities 31 and 33 and a closed position in which they meet in the centre of the housing assembly 18. The movement of the shutters is perpendicular to the central axis of the cylindrical housing assembly 18. The shutters 30 and 32 are spring biased to the closed position as shown in FIG. 2. Each of the shutters has a contact surface 34 and 36 facing the sensor aperture 28 that is orientated at approximately 45° to the central axis of the cylindrical housing assembly 18 and the cylindrical housing body 12.

The shutters 30 and 32 each have a face which meets a face of the other shutter. One of the shutters 30 has a protrusion 38 on the face that meets the other shutter. The protrusion 38 is substantially triangular in cross-section. The other shutter 32 has a corresponding groove 40 which receives the protrusion 38 when the shutters are in a closed position as shown in FIG. 2.

The quartz window 14 located in the radiation aperture 24 is transparent to UV radiation. When the sensor housing 10 is mounted in the wall of a chamber which is flooded with UV radiation, the UV radiation can pass through the radiation aperture 24 and into the sensor space 22. The shutters 30 and 32 are opaque to UV radiation and therefore when in the closed position they prevent UV radiation from travelling from the sensor space 22 through the sensor aperture 28.

When the shutters 30 and 32 are in the closed position, the interface between them is interrupted by the protrusion 40. This has the result that even when the shutters 30 and 32 are not in direct contact, due for example to the presence of a fragment of dust or grit, there is no straight path which radiation can follow from the quartz window 14 to the sensor aperture 28. Therefore UV radiation is blocked even when there is a small gap between the shutters 30 and 32.

Figure 4:
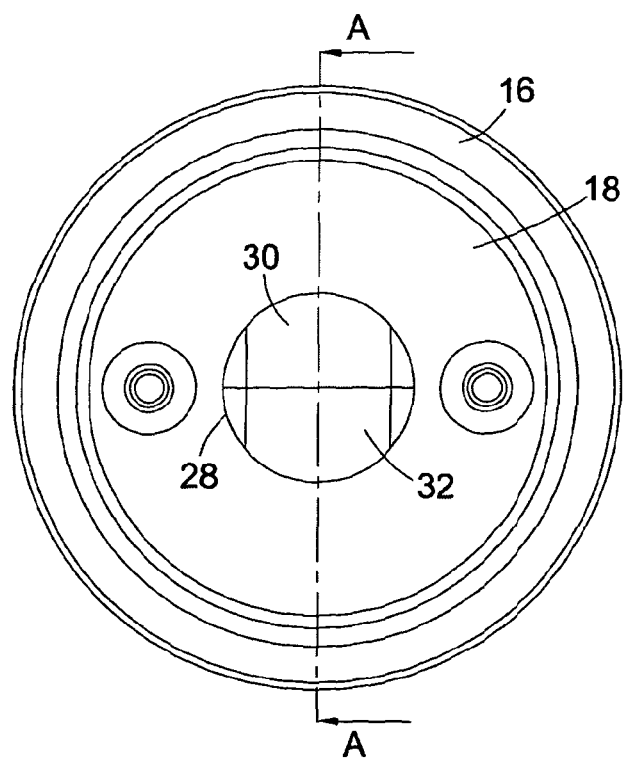
FIG. 4 shows an end view of a radiation sensor housing.

FIG. 4 shows a view of the sensor housing 10 from above. The top of the housing assembly 18 is annular and surrounds sensor aperture 28 which is circular. The flange 16 is circular and has a greater diameter than the housing assembly 18. The shutters 30 and 32 block the sensor aperture 28 so that the radiation aperture cannot be seen.

While the flange is described above as circular, other shapes and arrangements could be used, for example, the flange may be square or hexagonal.

Figure 5:
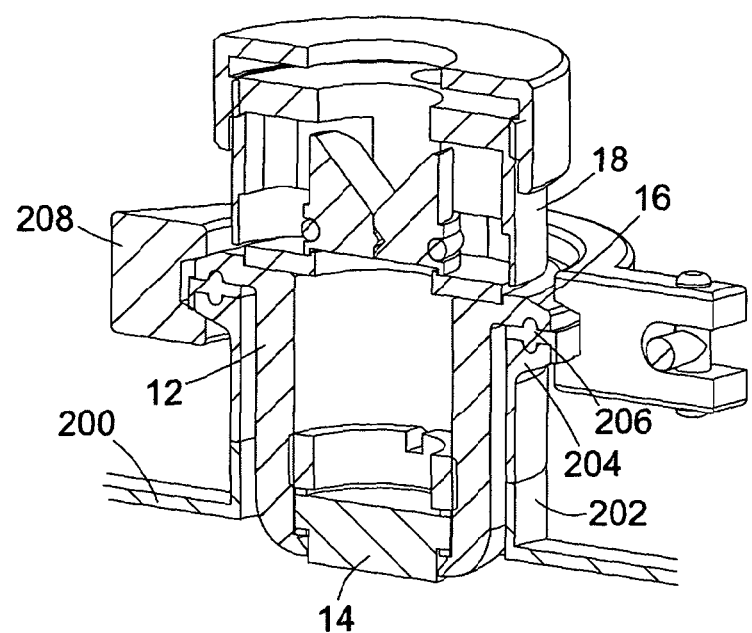
FIG. 5 shows an isometric sectional view of a sensor housing mounted on a chamber.

FIG. 5 shows an isometric sectional view of a sensor housing mounted on a chamber. The chamber has a cylindrical main section 200. A cylindrical connector 202 extends from the wall of the main section 200. The cylindrical connector 202 extends perpendicularly to the central axis of the cylindrical main section 200. There is a flange 204 around the end of the cylindrical connector 202 around the end not connected to the main section 200. The flange 204 has a circular groove around the surface facing away from the main section 200. A gasket 206 fits into this groove.

The sensor housing 10 fits into the cylindrical connector 202 such that the flange 16 on the housing body 12 meets with the flange 204 on the connector 202. The housing body 12 extends through the cylindrical connector 202 so that the quartz window 14 protrudes into the cylindrical main section 200 of the chamber. The housing assembly 18 extends away from the cylindrical connector 202. A clamp 208 holds the flange 16 on the housing body 12 against the flange 204 on the cylindrical connector 202.

Figure 6:
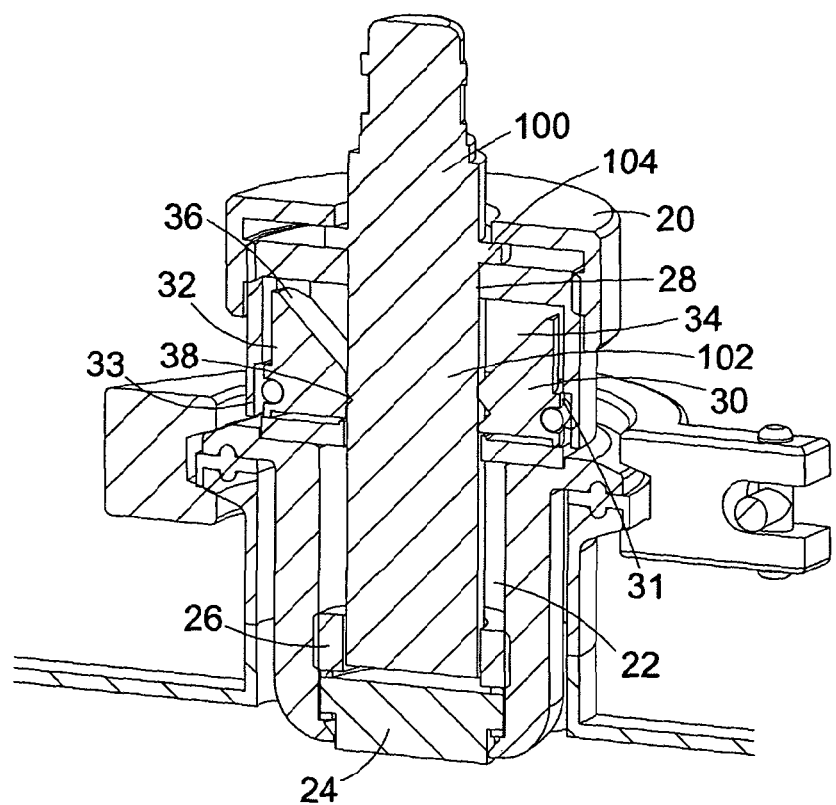
FIG. 6 shows an isometric view of the sensor housing with a sensor.

FIG. 6 shows an isometric view of the sensor housing 10 with a sensor 100 inserted into it. The sensor 100 has a cylindrical probe portion 102 that is sized according to Austrian Standards Institute (Österreichisches Normungsinstitut or ÖNORM) standard M5873 or German Technical and Scientific Association for Gas and Water (Deutsche Vereinigung des Gas- and Wasserfaches or DVGW) standard W294. An example of such a sensor is the Type SUV 20.1 available from IL Metronic Sensortechnik GmbH.

The cylindrical probe portion 102 of the sensor 100 is received in the sensor space 22 of the housing body and the tip of the probe portion 102 is received within the annular spacer 26. The sensor has a collar 104 around the top of the probe portion 102. The collar 104 is wider than the sensor aperture 28 of the housing assembly 18. The collar 104 rests against the sensor aperture 28. The cap 20 fits over the collar 104 and holds the sensor 100 in place in the sensor housing 10.

The sensor housing may be sized to suit radiometers having different dimensions to the standards described above. Further, the sensor may be held in the sensor with an alternative mechanism to the cap and collar discussed above.

The probe portion 102 of sensor 100 can be inserted into the sensor housing 10 through the sensor aperture 28. As probe portion 102 inserted into the sensor housing 10, the tip of the probe portion 102 contacts with the contact surfaces 34 and 36 of the shutters 30 and 32 that face the sensor aperture 28. The contact surfaces 34 and 36 are inclined with respect to the probe portion. As the sensor 100 is forced further into the housing 10 along the central axis of the housing body 12 and the housing assembly 18, the shutters 30 and 32 are urged outward and into the cavities 31 and 33 and thus open allowing the probe portion 102 of the sensor 100 to move towards the quartz window 14.

The protrusion 38 on the shutter 32 has a surface that contacts the probe portion 102 of the sensor 100 at approximately the same angle as the contact surface 34 of the shutter 32. Therefore, the shutter 32 with the protrusion 38 is urged further into the cavity 33 when the tip of the probe portion 102 contacts with the protrusion 38. When the sensor is removed from the housing 10, the springs biasing the shutters 30 and 32 urge the shutters back together and thus the shutters prevent UV radiation which enters through the radiation aperture 24 from exiting through the sensor aperture 28.

Figure 7:
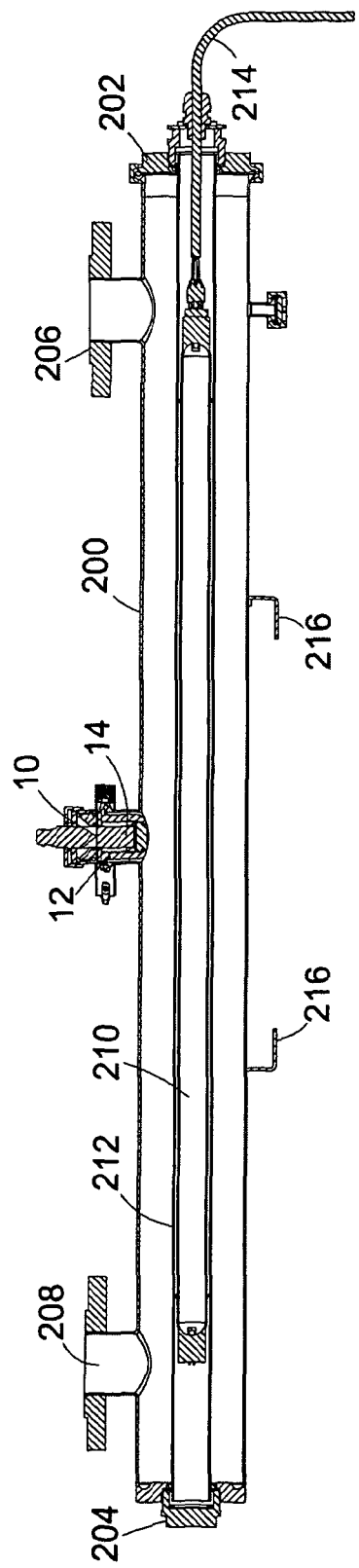
FIG. 7 shows a cylindrical fluid treatment chamber.

FIG. 7 shows a cylindrical fluid treatment chamber 200. Fluid is passed through the chamber 200 to be treated with UV radiation. The chamber 200 has sealed ends 202 and 204. A sensor housing 10 is located in on the wall of the chamber 200 between the ends 202 and 204. The sensor housing 10 is arranged so that it points upwards as shown in FIG.7. The chamber 200 is connectable to a fluid system by connectors 206 and 208 which are located close to the ends 202 and 204. The connectors 206 and 208 allow pipes to be connected to the chamber 200. When pipes are connected to the connectors they run perpendicular to the axis of the chamber 200 and in the same direction as the sensor housing 10. When pipes are connected to the connectors 206 and 208, a U-shaped system is formed. A cylindrical UV lamp 210 is sealed within a sleeve 212 that runs through the chamber 200 along its central axis. The sleeve 210 is cylindrical and extends the full length of the chamber 200. A tube 214 carrying power cables to the UV lamp 210 passes through one end 202 of the chamber 200.

The chamber has supports 214 located on the curved wall on the opposite site to the connectors 206 and 208 and the sensor housing 10.

Sensor housings may be arranged at other locations on the chamber wall. They can be arranged close to either or both or the inlet and the outlet or they may be arranged in between the inlet and outlet. Further, the sensor housings may be placed at different angular positions on the chamber wall.

In use, the fluid is passed through the chamber 200 from one connector 206 to the other connector 208. As the fluid flows through the chamber 200 it passes the UV lamp 210. The sensor in the sensor housing 10 detects the UV radiation passing from the UV lamp 210 through the fluid.

The walls of the chamber 200 and the housing body 12 may be made of stainless steel. The quartz window 14 is transparent to UV radiation and therefore allows UV radiation to pass from the chamber into the sensor space. When there is no sensor present in the sensor housing 10, the shutters prevent the UV radiation from passing through the sensor aperture to the outside of the chamber.

Figure 8:
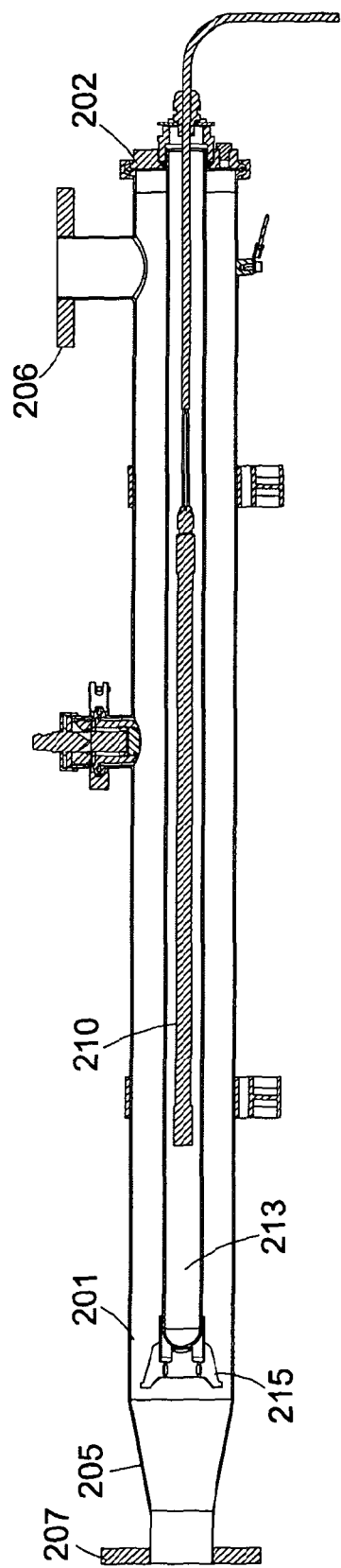
FIG. 8 shows an alternative fluid treatment chamber arrangement.

FIG. 8 shows an alternative fluid treatment chamber 201 arrangement. The chamber 201 shown in FIG. 8 forms part of an L-shaped system. At one end 202, a connector 206 joins to the curved wall of the cylindrical chamber 201 as described above in relation to FIG. 7. At the opposite end 205, the connector 207 is cone shaped and continues from the end 205 of the chamber 201. The tube 213 housing the UV lamp 210 terminates at a point 215 within the chamber 201.

The manner in which the sensor housing is constructed and coupled to the chamber may vary according to the application. For example in the food industry a great emphasis is placed on hygiene, in waste water treatment, the housing and its coupling to the chamber must be robust. In both of these and other applications, the ability to remove the sensor without radiation escaping from the chamber can be realised with a sensor housing with shutters that block radiation when the sensor is removed.

Figure 9:
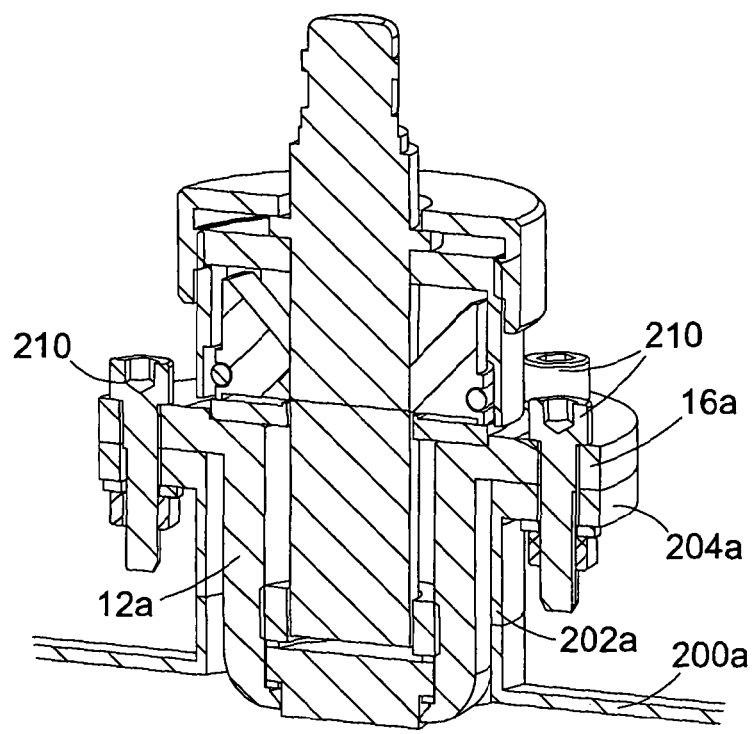
FIG. 9 shows an isometric sectional view of a sensor housing bolted on a chamber by a bolted flange

FIG. 9 shows an isometric sectional view of a sensor housing mounted on a chamber. In the embodiment shown in FIG. 9, the sensor housing is attached to the chamber 200a using bolts 210. The flange 16a of the housing body 12a has holes around its circumference and the flange 204a on cylindrical connector 202a has corresponding holes. Bolts 210 pass through the holes to hold the sensor housing in place on the chamber 200a.

Figure 10:
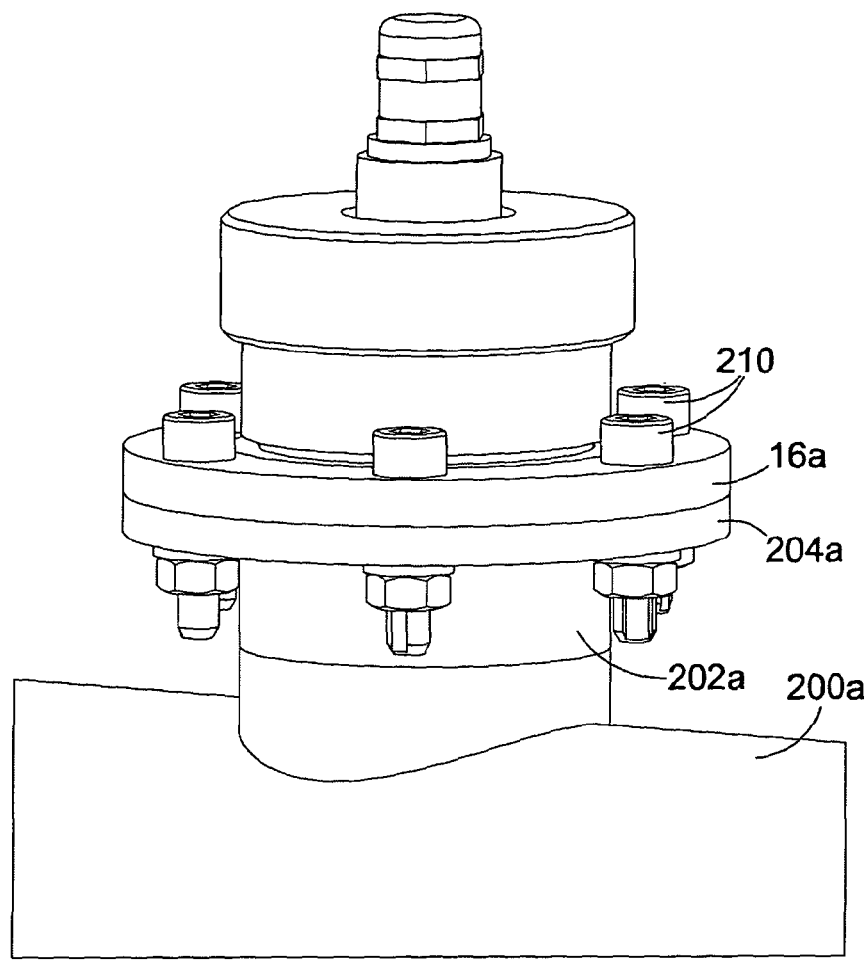
FIG. 10 shows an external view of a sensor housing bolted on a chamber by a bolted flange.

FIG. 10 shows an external view of a sensor housing bolted to a chamber as described in reference to FIG. 9.

Referring back to FIG. 1, there is shown an isometric view of a sensor housing welded to a chamber. In the embodiment shown in FIG. 1, the housing body 12b is welded to the chamber 200b. The housing body 12b is welded into a circular hole in the side of the chamber 200b so that it extends perpendicular to the central axis of the chamber 200b.

Figure 11:
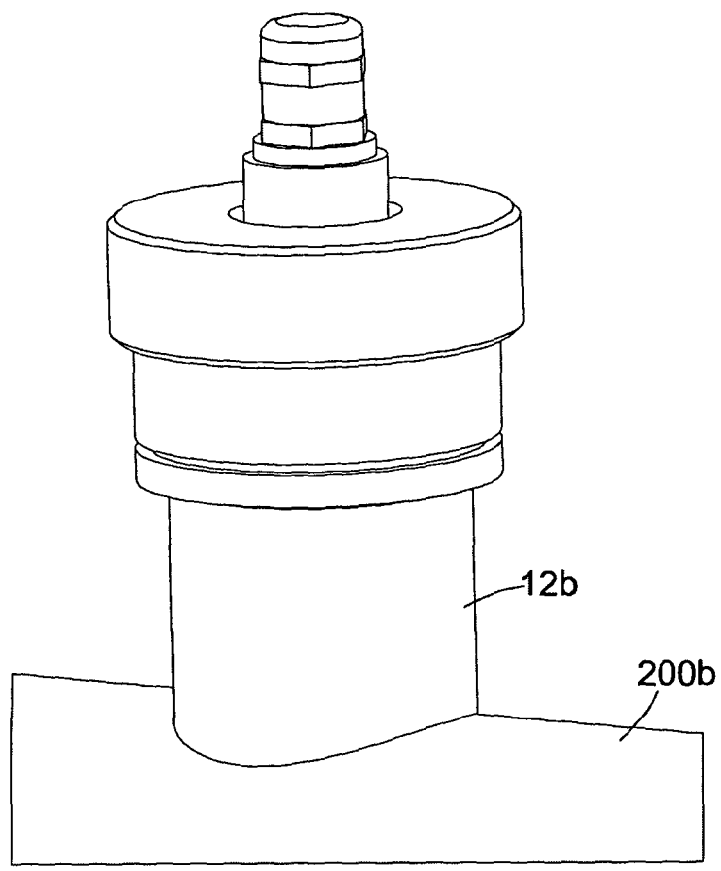
FIG. 11 shows an external view of a sensor housing welded to a chamber.

FIG. 11 shows an external view of a sensor housing welded to a chamber as described in reference to FIG. 1.

Figure 12:
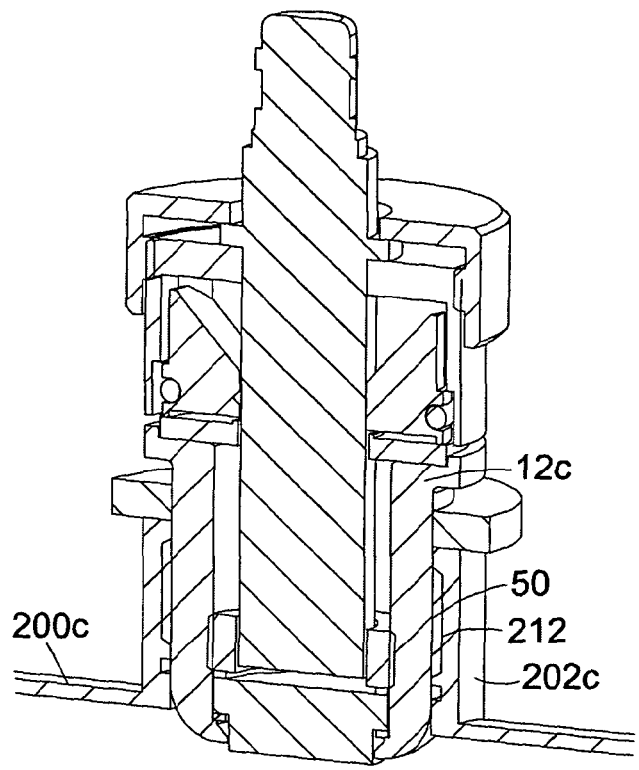
FIG. 12 shows an isometric view of a sensor housing coupled to a chamber by a threaded engagement.

FIG. 12 shows an isometric view of a sensor housing coupled to a chamber by a threaded engagement. In the embodiment shown in FIG. 12, the housing body 12c has a threading 50 on an external surface. The cylindrical connector 202c extending from the chamber 200c has a corresponding threading 212 on its interior. The threading 50 on the housing body 12c engages with the threading 212 on the interior of the cylindrical connector 202c and holds the sensor housing in place on the chamber 200c. The sensor housing can be attached and detached from the chamber by turning it relative to the chamber 200c.

Figure 13:
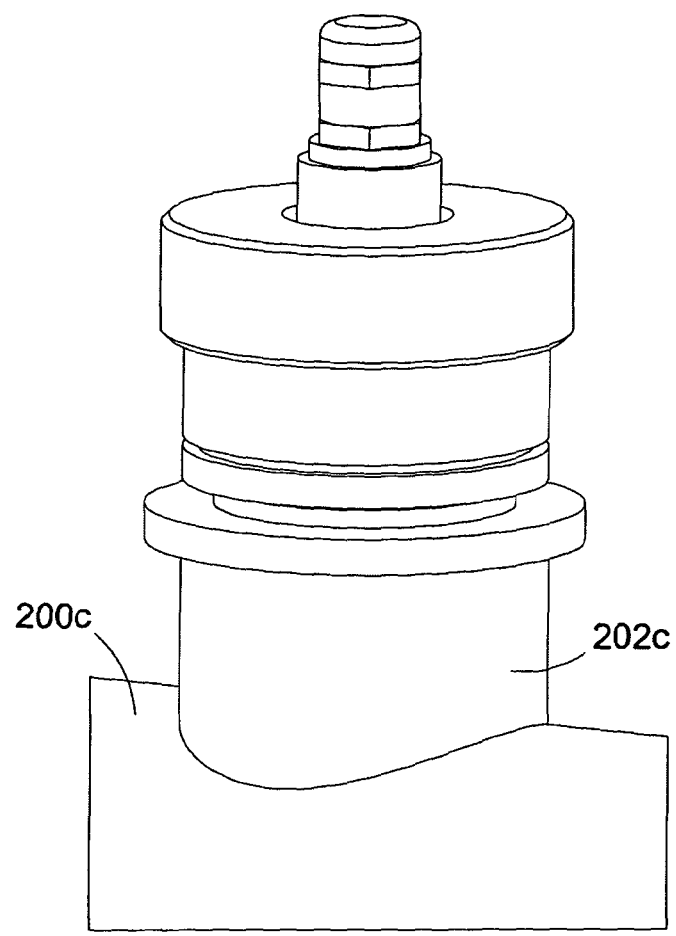
FIG. 13 shows an external view of a sensor housing attached to a chamber by a threaded engagement.

FIG. 13 shows an external view of a sensor housing attached to a chamber by a threaded engagement as described in reference to FIG. 12 above.

In the examples described above, two shutters are arranged to block the sensor aperture when a sensor in not in place, however, other arrangements such as a single shutter or a three or more shutters could be used.

The invention claimed is:

1. A radiation sensor housing, comprising:
a sensor aperture arranged to allow a sensor to be moved into a sensor space within the housing;
a radiation aperture through which radiation can reach the sensor when the sensor is positioned in the sensor space; and
a plurality of shutters operable to move between an open position and a closed position in which radiation is blocked from passing through the sensor aperture, one shutter of the plurality of shutters having a part configured to overlap with another shutter of the plurality of shutters in the closed position, the plurality of shutters being arranged to co-operate with the sensor such that when the plurality of shutters is between the open position and the closed position radiation from the radiation aperture is blocked from passing out of the sensor space through the sensor aperture by the sensor and the plurality of shutters together.

2. The radiation sensor housing according to claim 1, wherein the plurality of shutters are arranged to move towards the open position in dependence upon movement of the sensor into the sensor space.

3. The radiation sensor housing according to claim 1, wherein the plurality of shutters are operable to move towards the closed position in dependence upon movement of the sensor out of the sensor space.

4. The radiation sensor housing according to claim 1, further comprising biasing means for biasing the plurality of shutters towards the closed position.

5. The radiation sensor housing according to claim 1, wherein the plurality of shutters comprises a contact surface, and the plurality of shutters is arranged to be responsive to the sensor being forced against the contact surface by moving towards the open position.

6. The radiation sensor housing according to claim 5, wherein the contact surface is inclined relative to the axis along which the sensor is movable into the sensor space.

7. The radiation sensor according to claim 1, wherein at least one shutter of the plurality of shutters is arranged to overlap with the sensor housing in the closed position.

8. The radiation sensor housing according to claim 1, wherein in the closed position the plurality of shutters are in contact one with another.

9. The radiation sensor housing according to claim 1, being for use in a treatment system for treatment of a fluid.

10. The radiation sensor housing according to claim 1, wherein the radiation sensor housing is for housing a radiation sensor for sensing ultraviolet radiation.

11. The radiation sensor housing according to claim 1, wherein the plurality of shutters are opaque to ultraviolet radiation.

12. The A radiation sensor housing according to claim 1, arranged relative to a treatment chamber and to a source of electromagnetic radiation such that, in operation electromagnetic radiation may pass from the source through the treatment chamber to the radiation aperture of the radiation sensor housing.

13. The A radiation sensor housing according to claim 1, wherein the radiation aperture comprises a window of UV translucent or transparent material.

14. An apparatus for treating a fluid with UV radiation, the apparatus comprising:
- a treatment chamber arranged to contain the fluid;
- a source of UV radiation arranged relative to the treatment chamber such that UV radiation is incident upon fluid within the chamber; and
- a radiation sensor housing according to claim 1 arranged such that radiation from the source of UV radiation passes through the radiation aperture of the radiation sensor housing.

* * * * *

UNITED STATES PATENT AND TRADEMARK OFFICE
CERTIFICATE OF CORRECTION

| | |
|---|---|
| PATENT NO. | : 8,859,987 B2 |
| APPLICATION NO. | : 13/578988 |
| DATED | : October 14, 2014 |
| INVENTOR(S) | : Nigel Clark |

It is certified that error appears in the above-identified patent and that said Letters Patent is hereby corrected as shown below:

On the title page item (57), in "Abstract", in column 2, line 7, before "close", delete "that", therefor In the claims, In column 8, line 62, in Claim 12, after "The", delete "A", therefor In column 9, line 1, in Claim 13, after "The", delete "A", therefor Signed and Sealed this
Third Day of November, 2015

Michelle K. Lee
*Director of the United States Patent and Trademark Office*